United States Patent [19]

Stolzer

[11] Patent Number: 4,557,171

[45] Date of Patent: Dec. 10, 1985

[54] MACHINE TOOL, PARTICULARLY BAND SAW, WITH LIGHTWEIGHT SAW BAND CARRIER

[75] Inventor: Paul Stolzer, Achern, Fed. Rep. of Germany

[73] Assignee: Keuro Maschinenbau Gesellschaft mit beschränkter Haftung & Co. Kommanditgesellschaft, Achern-Gamshurst, Fed. Rep. of Germany

[21] Appl. No.: 602,003

[22] Filed: Apr. 19, 1984

[30] Foreign Application Priority Data

Apr. 26, 1983 [DE] Fed. Rep. of Germany ... 8312211[U]

[51] Int. Cl.⁴ ............................................. B23D 55/06
[52] U.S. Cl. ...................................... 83/796; 76/112; 83/788; 83/859; 83/701
[58] Field of Search .................. 83/859, 860, 701, 788, 83/794–801; 51/166 R, 166 FB; 76/112, 25 R

[56] References Cited

U.S. PATENT DOCUMENTS

| | | | |
|---|---|---|---|
| 3,589,214 | 6/1971 | Lindsay | 51/166 FB |
| 3,799,024 | 3/1974 | Alexander | 83/701 X |
| 3,805,657 | 4/1974 | Simpson | 83/701 X |

Primary Examiner—James M. Meister
Attorney, Agent, or Firm—Frishauf, Holtz, Goodman & Woodward

[57] ABSTRACT

A machine tool, typically a band saw, has a support carrier or carriage for bearings to journal saw band pulleys, guide attachment elements for saw band guides, attachment elements for a motor, and coupling elements to couple a feeding arrangement to the carrier or carriage; in accordance with the invention, the carrier or carriage is a cast structure essentially and primarily consisting of concrete polymer, into which the respective bearings and attachment elements are cast. The bearings and attchment elements may be formed as metal or plastic plates, sleeves cast into the concrete polymer and the like.

9 Claims, 8 Drawing Figures

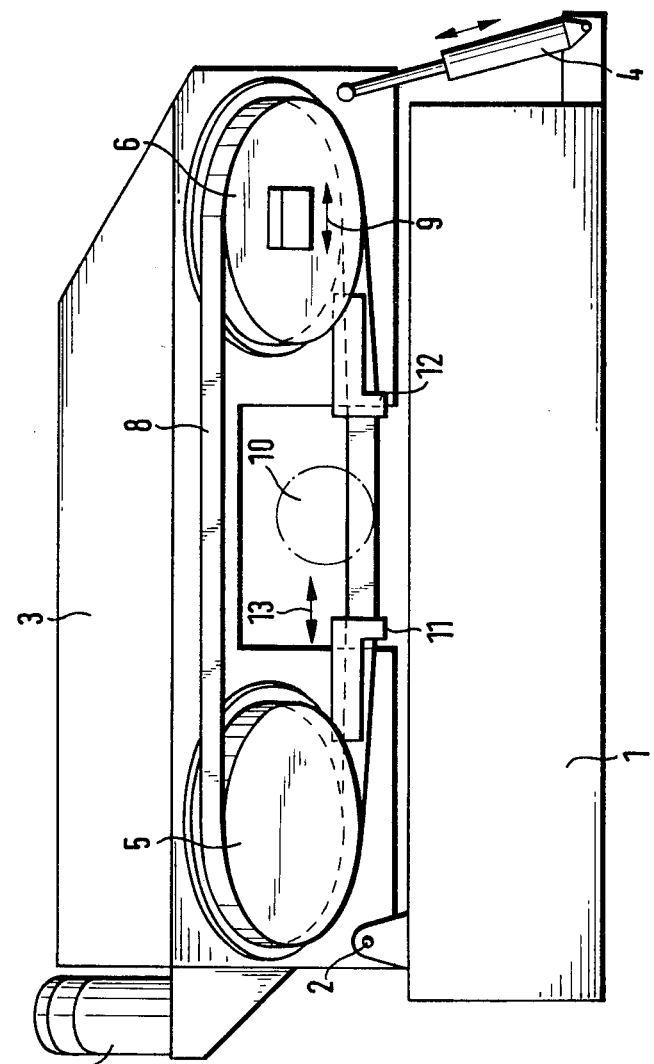
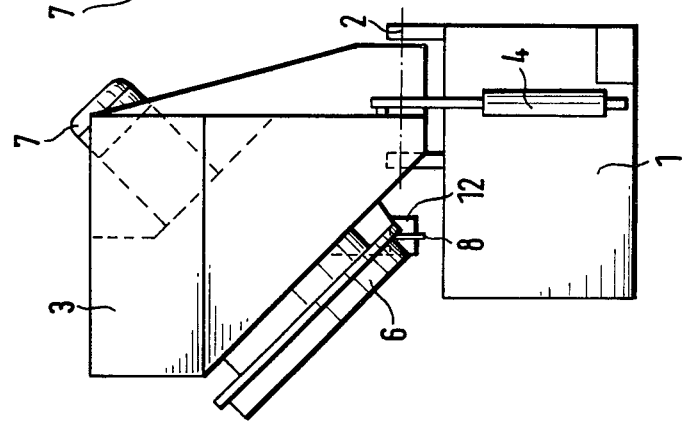
FIG. 1B
FIG. 1A

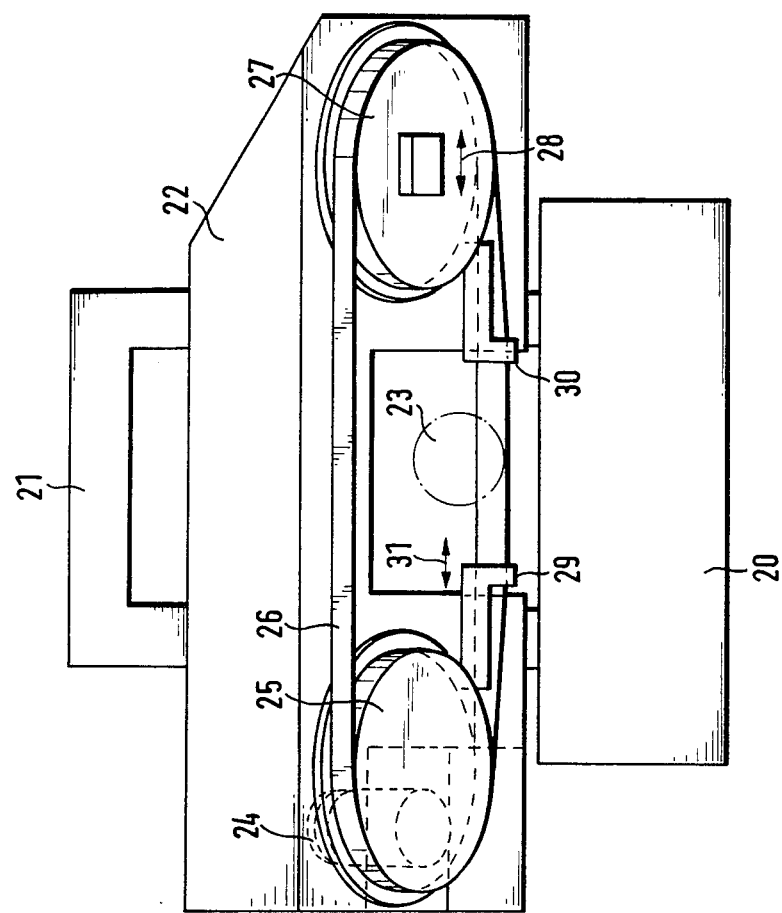
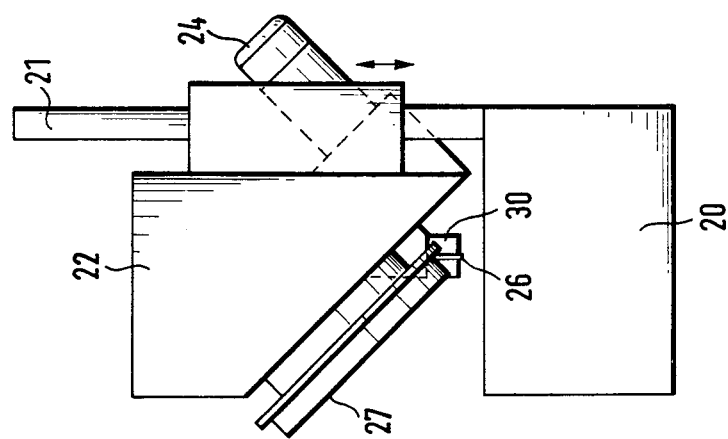
FIG. 2B
FIG. 2A

MACHINE TOOL, PARTICULARLY BAND SAW, WITH LIGHTWEIGHT SAW BAND CARRIER

The present invention relates to machine tools, and more particularly to a band saw, in which a frame is provided to hold a workpiece, and a tool carrier or carriage is provided to hold the saw band, a drive motor therefor, and to feed the saw band against and into the workpiece.

BACKGROUND

Band saws usually have a frame which holds a workpiece, and include a support, holder or carriage for pulleys or sheaves over which a saw band is looped, the saw band being driven by a motor which drives at least one of the pulleys. The carriage further holds guide elements which guide the saw band into suitable orientation so that the saw band will cut into the workpiece in accordance with a desired configuration or angle. The saw band is an endless loop, passing through the workpiece and being guided therethrough by slide guides to stabilize the orientation of the band with respect to the cut to be made. The carrier or carriage may be pivoted on the table, or may be slidable with respect thereto in order to appropriately feed the saw band against the workpiece.

Band saws of this type are made in various models. The present invention is applicable to all the types of band saws. In one type of band saw, the drive and guide pulleys are located essentially horizontally opposite a horizontal workpiece holding table. The height adjustment of the saw band with respect to the workpiece can be controlled mechanically or hydraulically, so that the saw band, upon being driven by the motor, will enter into and engage the workpiece.

In accordance with another construction, the carrier or carriage for the sheaves or pulleys of the saw band are pivotably connected to the machine frame. Pivoting movement is controlled mechanically or hydraulically. Another construction utilizes a vertically positioned carriage or saw band pulley carrier which which can be moved relative to the workpiece by horizontal guide and feed structures.

Most band saws are so made that the carrier structure or carriage for the saw band pulleys also carries all other essential elements for the operation of the saw, namely the return pulley, the drive motor, and the guide element to twist the saw band, or otherwise position the saw band, so that it will cut in the proper sawing plane. Further, means to tension the saw band by mechanical, electrical, or hydraulic repositioning of the idler pulley about which the endless saw band is looped, electrical and/or pneumatic control apparatus, bearings for the respective pulleys, ducts for supply of cooling and/or cutting fluid, and the like. The carrier structure or carriage, thus, is an important element for the overall operation of the band saw, including guidance and feeding of the saw band with respect to the workpiece.

It has been customary to make the carrier element or carriage for the sheaves or pulleys as a cast-iron structure, or as a frame structure, for example a hollow beam, which is welded together. The respective surfaces necessary to provide for guidance, and detachment elements for the motor, for bearings and the like, are then constructed by machining the casting or welded construction on boring and/or milling machines, so that that the raw casting will receive the required dimensions. This requires expensive machine tools, and results in high manufacturing and machining costs.

THE INVENTION

It is an object to provide a carrier or carriage structure for operating elements of a machine tool, particularly for the pulley carrier for a band saw of the type described hereinbefore, which is easy to make, lightweight, and in which machining of the various operating surfaces which are required to be accurately positioned—such as bearings, attachment surfaces for operating elements, and the like—can be eliminated, or made in a single working step, upon manufacture of the carriage itself. Further, the inherent oscillation or bending characteristic of the carrier or carriage should be improved, particularly with respect to static as well as dynamic stiffness in order to increase the operating capability of a band saw of a given size, and the lifetime of the saw bands used therewith.

Briefly, the support structure or carrier or carriage is made as a molded casting of concrete polymer, within which those surfaces which must have specific, accurately oriented and sized dimensions are cast into the concrete polymer upon manufacture thereof. These are, specifically, the bearings for the pulleys, attachment for the saw band guides, attachments for the saw band drive, such as an electric motor, saw band tensioning arrangements, and attachment plates or surfaces or fixtures which permit movement of the carrier or carriage, and hence feeding of the saw band with respect to a workpiece. The respective elements may be metal elements, such as bearing sleeves, attachment plates or the like, or may, themselves, be specific plastic elements, shaped for example to receive screws or counter elements. In accordance with a preferred structure, at least some of those elements cast into the concrete polymer may, additionally, be formed with inwardly extending projections, for example having laterally extending prongs in the form of an anchor, for additional reliable incorporation of the elements into the carrier.

The structure has the advantage that the entire carrier or carriage can be made in a single working step, by casting the concrete polymer in a suitable mold, in which, earlier, the respective operating elements or surface portions have been placed. The concrete polymer forms an intimate bond with these elements which is entirely sufficient in order to accept the forces which arise. This is particularly important since concrete polymer has extremely low shrinkage, so that the casting may have an overall dimensional tolerance of only 0.1 mm, entirely sufficient for a band saw carriage, so that subsequent machining is no longer necessary.

It has been found, surprisingly, that a carriage structure made of concrete polymer has a substantially higher damping factor in comparison to grey iron casting, or to welded constructions; this results in substantially better characteristics with respect to oscillations or vibrations, and hence results in substantially lower noise level of a band saw when operating. A machine tool element such as the carriage for a band saw made of concrete polymer need not be painted or lacquered, or otherwise protected against attack by water, or corrosive substances; it is essentially immune with respect to the effects of cooling fluids and lubricants customarily used; colored structures can be easily made by adding suitable pigments to the concrete polymer, so that color coding or specific color schemes can be easily provided.

Other operating elements may also be incorporated in the casting, for example ducts, pipes, conduits, and ducting for cables; these may all be made of plastic elements and can be cast into the structure while the concrete polymer is being poured.

The concrete polymer itself essentially is made of epoxy resin or a methacrylic resin, which has quartz or similar fillers added thereto. A low proportion of resin is desired. The material is mixed in a suitable mixing vessel; methacrylate resin permits continuous mass production, since the mixing apparatus itself will not gum or be choked by adhesion of the material. Methacrylate resin permits high strength with low resin content, so that the cost factor is desirably low. The excellent bonding characteristics of concrete polymer require, of course, that the mold used in the manufacture is internally coated with a suitable release agent which prevents bonding of the concrete polymer to the mold wall since, otherwise, the mold form would become destroyed and lost. Suitable coating or release agents are well known in connection with concrete polymer material.

The mold should be separable, or have inclined surfaces of at least 12° to 15°. The insert elements which, in the finished carriage will form the operating surfaces, must be clean, free from hydrocarbons and grease, and screwconnected or otherwise securely placed within the mold form.

In accordance with a feature of the invention, and if the carriage for the saw band pulleys is to be solid and massive, the operating elements may be made of metal or plastic. Depending on the space available for the carrier or for the carriage, it may be desirable to form the carriage structure as a hollow body, or at least as a part-hollow structure, the hollow spaces, during molding, being formed by displacement bodies or the like.

It is also possible to construct the carrier or carriage such that it will have thin metallic jacket, formed as a lost mold. In that case, the metallic jacket is used only to assist in molding of the concrete polymer, without having any specific carrying functions of the respective elements connected to the carrier or carriage. Use of such a jacket permits casting of complex shapes which may be difficult to cast in view of the mold design and mold release requirements.

In accordance with a feature of the invention, the respective operating elements may have support posts or anchors in the form of undulating or non-smooth surfaces, dowels, or the like.

Drawings:

FIG. 1A is a front view of a horizontal band—band saw;

FIG. 1B is a side view of the machine of FIG. 1;

FIG. 2A is a horizontal saw band band saw machine with parallel movable band pulley carrier;

FIG. 2B is a side view of the saw of FIG. 2A;

DETAILED DESCRIPTION

Figure 3:
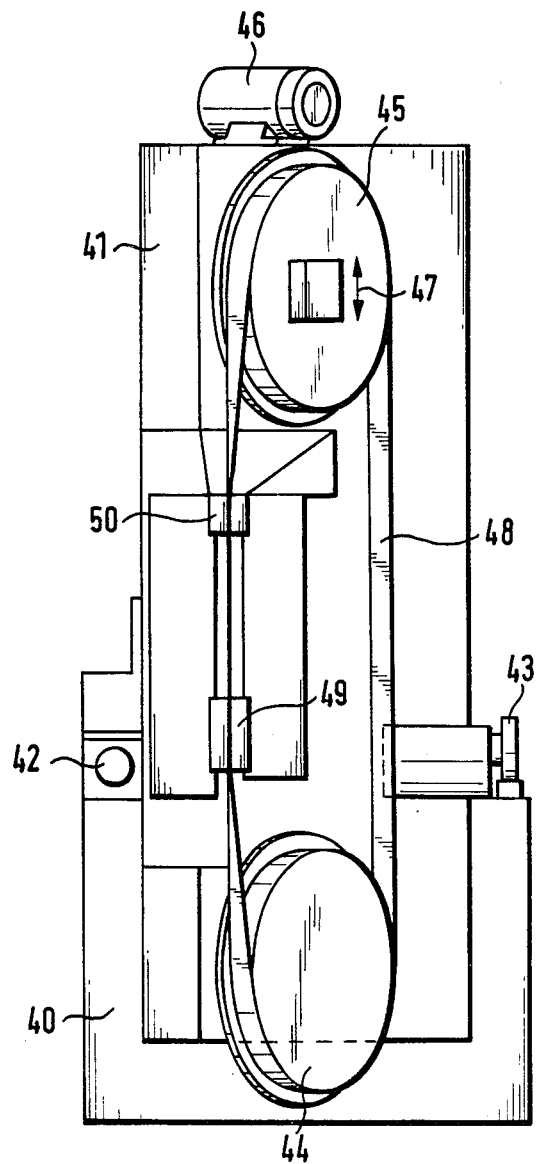
FIG. 3 is a front view of a vertical sawing path band saw, omitting all elements not essential for an understanding of the invention.

The horizontal band saw of FIG. 1, collectively, has a machine base or frame 1 on which a saw band pulley carrier 3 is pivotably connected. A pivot bearing 2 connects the carrier 3 to the frame or base 1. Pivoting movement is controlled by a cylinder—piston unit 4, for example hydraulically operated.

The carrier 3 carries the band pulleys 5, 6 which are rotatably journalled therein. A motor 7 drives pulley 5, the pulley 6 being an idler pulley, and is movable in accordance with the arrows 9, backwards and forwards, to permit tensioning of an endless saw band 8 looped about the pulleys 5 and 6. The band 8 is twisted out of the circumferential path about the pulleys by a pair of guide elements 11, 12 which guide the saw band 8 adjacent a workpiece 10. The guide elements 11, 12 are adjustable to move the band into the cutting plane. The guide elements 11 are adjustable, in accordance with the double arrow 13, to fit the guide elements to the size of the workpiece.

The horizontal band saw of FIG. 2 is similar to that of FIG. 1; it has a machine base 20, from which, in contrast to the structure of FIG. 1, a yoke 21 extends upwardly, along which the saw band pulley carrier 22 is vertically movable with respect to the workpiece 23. The saw band carrier also carries drive motor 24, rotating the drive pulley 25, which, in turn, moves the endless saw band 26. Saw band 26 is looped about an idler pulley 27 which can be moved in accordance with the double arrow 28 to release or to tension the saw band 26. Band guides 29, 30, adjustable as shown by the double arrow 31, are located adjacent the two sides of the workpiece 23. Vertical movement of the carrier 22 can be effected by a hydraulic lift, not shown, by a rack-and-pinion arrangement, or by any other suitable vertical adjustment or feed structure.

Figure 4:
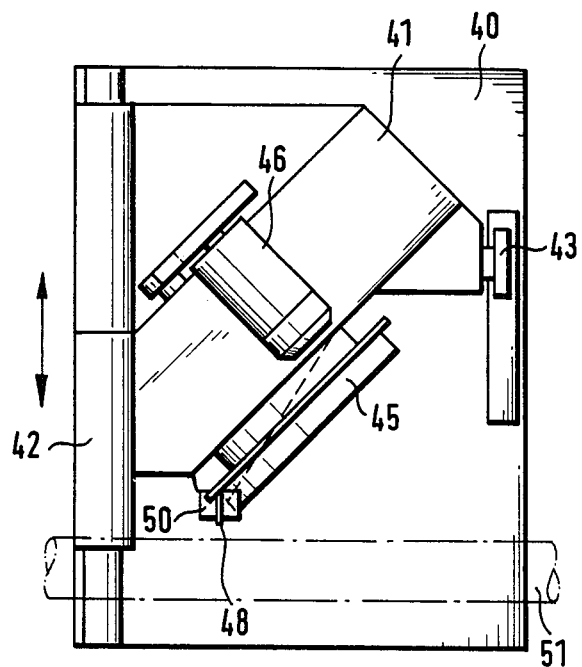
FIG. 4 is a top view of the saw of FIG. 3.

The band saw of FIGS. 3 and 4 has a machine base or frame 40 on which a carriage 41 can be horizontally along a guide 42 positioned at the left side—with respect to FIG. 3—of the frame 40, and supported at the right side by a support roller 43. The carriage 41 carries the pulleys 44, 45, and motor 46 which drives pulley 44. The pulley 45 is an idler pulley, and adjustable in accordance with the double arrow 47 for providing appropriate tension to the saw band 48. The guides 49, 50 which twist or control the position of the saw band 48 are above and below the plane of the workpiece; the upper band guide element 50 is made to be vertically adjustable for matching the position thereof to the diameter or cross section of the workpiece. The workpiece is shown in FIG. 4, schematically, as round stock 51.

Figure 5:
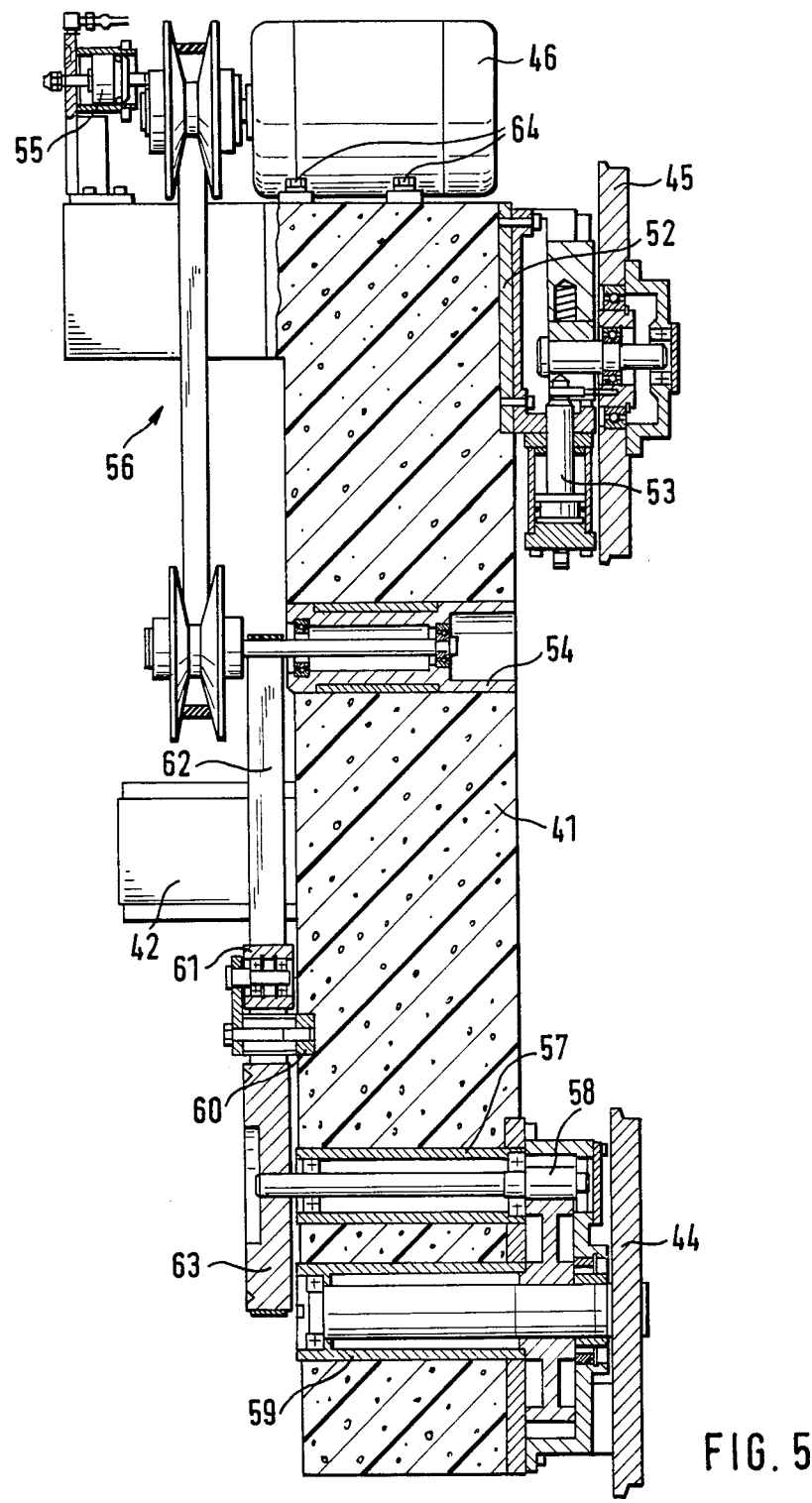
FIG. 5 is a fragmentary partly sectional view of the carrier or carriage for the saw band wheels or pulleys of the saw of FIGS. 3 and 4.

The pulley carrier or carriage used in the structure of FIGS. 3 and 4 is shown in a fragmentary vertical section in FIG. 5. The same reference numerals have been used as in FIGS. 4 and 5.

As best seen in FIG. 5, the carriage 41 is made of concrete polymer, into which the operating elements necessary for complete function and operation of the carriage are cast. A plate 52 is provided to secure the idler pulley 45 and, additionally, its adjustment arrangement 53 to provide for tensioning of the saw band—not shown in FIG. 5. A sleeve 54 is provided to form a holding structure for a double ball bearing to secure the shafts of a double-cone, stepless, variable-speed transmission. A sleeve 57 secures ball bearings for the drive connection 58 for the driven pulley 44. A sleeve 59 provides an outer structure to hold the bearing of the driven pulley. A small insert 60 is cast into the concrete polymer to form a bearing for a tension roller 61 to tension a drive belt 62 extending from the double-cone, infinitely variable-speed drive 56 to the drive pulley 63 which is connected to the drive connection 58 to drive the lower pulley 44. Drive connection 58 to pulley 44, for example, is by gearing on a shaft journalled in the bearings retained in sleeves 57.

Thread-receiving anchors for connecting bolts 64 for the motor 46 are likewise cast into the structure 41; other operating elements, such as hydraulic ducts, fluid ducts, conduit ducts for electrical cables and the like can be cast into the structure, and are not shown in FIG. 5 for simplicity.

The carriage can be enclosed in a thin metallic shroud or jacket 80, which is shown only in fragmentary representation for simplicity of the drawing. The jacket 80 can be formed, for example, in two parts 80a, 80b, welded together as schematically shown at 81.

Figure 6:
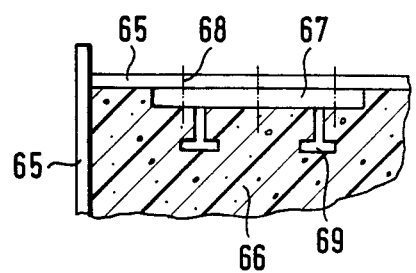
FIG. 6 is a fragmentary, highly schematic sectional view of a detail of the carrier or carriage.

The structure 41 can be a solid massive element. Depending on size, however, material and weight can be saved by forming hollow areas therein. FIG. 6 illustrates a portion of such a structure 66, in which a hollow region 75 is formed, for example by introducing displacement elements or displacement bodies in a mold before casting. FIG. 6 also shows a detail of a mold structure 65 in which, before concrete polymer is introduced, an element 67 which is formed with holes 68 for the acceptance of bolts at a later time, is anchored within the cast polymer by projections 69 which have laterally extending wings 69a. The element 67 may, for example, be used for the part 52, FIG. 5, that is, to support the idler pulley and the tensioning arrangement therefor. Prior to casting the concrete polymer 66, screws 68 are inserted through the mold form 65 to secure the plate 67 in position. The screws 68 are removed prior to releasing of the respective mold element 65.

It has been found that the respective operating elements are properly aligned and properly dimensioned with respect to each other, which is due to the extremely low shrinkage of concrete polymer. Thus, for all practical purposes, the accuracy of dimension can be maintained, so that subsequent machining, after casting, is not necessary. The elements which are used, such as the double-cone drive 56, the pulleys 44, 45, the drive 62 and the like, are, usually, mutually adjustable, so that precise dimensioning is not usually required, and a raw casting, without subsequent machining, suffices for practically all commercial structures.

Various changes and modifications may be made, and any features described herein may be used with any of the others, within the scope of the inventive concept. For example, the wings 69a may be used in any of the other structures; they need not be of the shape shown, but, for example, may also have the form of spread-apart anchoring elements, spread dowel pins or the like.

EXAMPLE

A typical carriage 41 has the following dimensions:
length: 1580 mm,
width: 460 mm,
height: 460 mm,
weight: about 420 kg
The dimensions are overall dimensions.
The material is:
a polymethyl-acrylate-resin, e.g. "Plexilith 201" (Trademark of Roehm GmbH, Fed. Rep. Germany) which is a liquid of low viscosity and a monomer-mixture on the basis of methyl-methacrylate. It is used together with a mixture of filling materials Plexilith "201.1", a quartz product with controlled fraction including a hardener, other filling materials and additives. Additives of pigment may also be used, a minor quantity by weight of the overall mixture, for example green, blue or red, the latter forming a warning because of the potentially hazardous saw band if improperly used or installed.

I claim:
1. Band saw having a frame (1, 20, 40);
   a workpiece support secured to the frame to hold and position a workpiece (10, 23, 51) thereon;
   an endless saw band (8, 26, 48);
   saw band guide and transport pulleys (5, 6; 25, 27; 44, 45) supporting and guiding the saw band;
   guide means (11, 12; 29, 30; 49, 50) guiding the saw band in oriented position with respect to the workpiece;
   a drive motor (7, 24, 46) coupled to at least one of the guide and transport pulleys;
   feeding means (4) to feed the saw band relative to the workpiece; and
   a carrier or carriage (3, 22, 41) for supporting the guide and transport pulleys, the guide means, and the drive motor, and coupled to the feeding means,
wherein, in accordance with the invention, the carrier or carriage (3, 22, 41) comprises
   a cast structure essentially and primarily consisting of concrete polymer; and
wherein
   bearings (52, 54, 57, 59, 60, 61) for journalling the pulleys (5, 6; 25, 27; 44, 45),
   guide attachment means for the saw band guide means (11, 12; 29, 30; 49, 50),
   motor attachment means for the motor (7, 24, 46),
   feed attachment means for moving the carrier relative to the workpiece,
comprise attachment elements cast into the concrete polymer.

2. Band saw according to claim 1, wherein at least some of the attachment elements comprise metal elements.

3. Band saw according to claim 1, wherein at least some of the attachment elements comprise plastic elements.

4. Band saw according to claim 1, wherein at least some of the attachment elements comprise metal parts, and others of the attachment elements comprise plastic parts.

5. Band saw according to claim 1, including metal sleeves cast into the polymer and surrounding rotary bearing portions.

6. Band saw according to claim 1, wherein the carrier or carriage (3, 22, 41) is a solid massive body.

7. Band saw according to claim 1, wherein the carrier or carriage (3, 22) is formed with internal hollow spaces (75).

8. Band saw according to claim 1, further comprising a thin metal jacket (80, 80a, 80b, 81) surrounding the cast carrier or carriage and forming a lost mold element.

9. Band saw according to claim 1, wherein at least some of said attachment means comprise plates oriented to have a major surface parallel to an exposed surface of said carrier or carriage; and
   wherein said plates are formed with projecting anchoring elements (69) extending inwardly of the cast concrete polymer structure.

* * * * *